3,124,449
METHOD AND COMPOSITION FOR THE TREATMENT OF SOIL
Joyce D. Nault, Garden Grove, Calif., assignor to The Dow Chemical Company, Midland, Mich., a corporation of Delaware
No Drawing. Filed May 31, 1960, Ser. No. 32,524
7 Claims. (Cl. 71—2.7)

The present invention relates to the treatment of soil and is particularly concerned with an improved method and composition for the stimulation of plant growth and for the control of soil-inhabiting life forms including invertebrate organisms and germinative seeds and emerging seedlings.

The concept of the chemical control of vegetation is of fairly recent origin. Beginning with the use of inorganic materials such as chlorates, arsenates, borax and salt, weed and vegetation control development has progressed through the phytotoxic petroleum products and dinitrophenols to the aryloxy-aliphatic acids and their salts and esters. One facet of the development has been concerned with the so-called "pre-emergence" type of weed control in which the toxic material is placed on or in the upper layers of the soil after the planting of the crop but prior to the emergence thereof. Here the agent comes in contact with and selectively stunts or kills the tender weed seedlings as they are emerging through the soil. However, such methods have had a limited use, since the desired crop plant must be resistant to the concentration of the toxic material introduced into the soil.

With non-resistant crop species, the farmer still is confronted with major problems of weed control. This is particularly true in the case of truck crops where expensive hand weeding is required. A further problem in the use of presently known weed control methods is presented by the seed or other organs of propagation of weed species which lie dormant below the zone treated with the toxic chemical. Under conventional crop management procedures, subsequent to an earlier "pre-emergence" treatment such seed may be brought near the surface of the soil where conditions are favorable for rapid germination and growth.

The introduction of chemical materials into the soil offers an excellent method for the control of various life forms and organisms found therein. However, the utilization of such a method has been most generally hampered by the limited variety of organisms against which most materials are effective. This means that soil which is infested with a variety of life forms must be subjected to multiple treatments with different toxicant materials in order to obtain the desired control. It would be desirable, for example to be able to treat soil with a single toxicant to free it of such diverse organisms as germinative seeds and emerging seedlings and invertebrate organisms including wireworms, nematodes, sugar beet nematodes and fungi.

It is an object of the present invention to provide a new method and composition for the fumigation of soil, including clay-type soils. A further object is to provide an improved method and composition for the suppression of the growth of undesirable vegetation. Another object is for the provision of a new method and composition for the control of soil-dwelling invertebrate organisms such as fungi, wireworms, sugar beet nematodes and root-knot nematodes. An additional object is the provision of an improved method and composition for substantially freeing soil or growth media of germinative and germinant seeds prior to the planting of the crop. A further object is to provide a method for treating soil which will improve the plant growing properties of soil and the growth of crops subsequently planted therein. Another object is the provision of new compositions adapted to be employed in the treatment of soil. Other objects will become apparent from the following specification and claims.

According to the present invention, it has been discovered that soil-inhabiting organisms such as fungi, wireworms, root-knot nematodes and sugar beet nematodes, and germinative seeds and emerging seedlings may be controlled by distributing 1,6-dichloro-2,4-hexadiyne through soil. It has been further discovered that such distribution of or impregnation with 1,6-dichloro-2,4-hexadiyne accomplishes changes in the soil which stimulate the growth and improve the growth characteristics of crops subsequently planted therein. For the control of invertebrate organisms, a parasiticidal amount of the active agent is employed, while for the control of germinative seeds and emerging seedlings the compound is employed in a growth-inhibiting amount. Where improved growth characteristics and enhanced crop yields are concerned, the above amounts of the hexadiyne compound induce soil changes effecting such improved and beneficial results. Thus, for example, crop plants raised on such fumigated soil have more luxuriant tops and roots and are of a greater total weight than those normally obtained from untreated soil.

1,6-dichloro-2,4-hexadiyne is a mobile liquid boiling at about 65° C. at 0.1 millimeter pressure, somewhat soluble in many organic solvents and of low solubility in water, and is adapted to be readily and conveniently distributed in soil. Further, when so employed, the compound accomplishes a rapid control of invertebrate organisms and induces soil changes which improve the growth characteristics of crops later raised in the treated soil. In addition, the compound also suppresses the growth of soil-inhabiting germinative seeds and emerging seedlings. It is among the advantages of the present invention that these desirable and beneficial results are obtained in sand, silt and clay type soils. It is a further advantage that the compound, while sufficiently persistent to accomplish the desired effect upon soil-inhabiting life forms such as invertebrate organisms and germinant seeds and emerging seedlings, or to achieve the changes in the soil which accomplish improved growth characteristics, dissipates in a reasonable period of time. Yet another advantage is that the compound permeates soil for a distance of several inches from the point of application depending upon the temperature, moisture content, compactness and physical consistency of the soil or growth media.

The distribution of at least a minimum effective dosage of 1,6-dichloro-2,4-hexadiyne in soil is essential for the practice of the present invention. In general, good controls of invertebrate organisms are obtained when the compound is distributed in the soil in the amount of from about 0.1 to 160 parts or more by weight per million parts by weight of soil. For the control of the growth of germinative seeds and emerging seedlings, good results are obtained when the agent is distributed through soil in the amount of from about 10 to 200 parts or more by weight per million parts by weight of soil, the exact dosage depending upon the vegetation type concerned and also upon the state of development of the seedlings. Where improved growth characteristics of crops and improved plant growing properties of soil are concerned, these same concentrations are particularly effective, although lower concentrations are sometimes effective.

In field applications, the hexadiyne compound may be distributed in the soil at a dosage of from about 1 to 200 pounds or more per acre, and through such a cross-section of soil as to provide for the presence therein of an effective concentration of the treating agent. In such applications, it is desirable that the compound be distributed to a depth of at least 2 inches. When the treatment is carried out by injection or drilling technique, it is preferred that the maximum distance between deposits be not materially in excess of 20 inches when the dosage is 20 pounds or more of toxicant per acre, and not materially in excess of 6 inches when the dosage is 2 pounds per acre, such maximum distance between deposits being directly proportional to the dosage of the active agent within the extremes recited.

The method of the present invention may be carried out by distributing the unmodified 1,6-dichloro-2,4-hexadiyne through the growth media as by impregnating or fumigating. However, the present method also embraces the employment of a liquid or dust composition containing the toxicant. In such usage, the compound may be modified with one or a plurality of additaments including solvents or other liquid carriers, dispersing and emulsifying agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the hexadiyne compound in the soil conveniently may be supplied per acre treated in from 5 to 27,000 gallons or more of the liquid carrier or in from about 50 to 1000 pounds of the solid carrier.

The exact concentration of the hexadiyne compound to be employed in the compositions may vary provided the required dosage of effective agent is supplied in the soil. The concentration of toxicant in liquid compositions employed to supply the desired dosage generally is from about 0.0001 to 50 percent by weight or higher. Sometimes, compositions containing up to 90 percent by weight of toxicant conveniently are employed in dusts, the concentration of toxicant may be from about 1 to 20 percent by weight. In compositions to be employed as concentrates, the toxicant may be present in a concentration of from about 5 to 98 percent by weight.

Liquid compositions containing the desired amount of the hexadiyne compound may be prepared by dissolving the toxicant in an organic liquid such as acetone, toluene, methylene chloride, chlorobenzene and petroleum distillates, or by dispersing the toxicant in water with the aid of a suitable dispersing and emulsifying agent. In soil, the preferred organic solvent carriers are those which are adapted to accomplish the penetration and impregnation of the soil with the compound and are of such volatility that they evaporate from the soil and leave little permanent residue therein.

The aqueous compositions to be employed in the present method may contain one or more water-immiscible solvents for the hexadiyne compound. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the compound in the aqueous carrier to produce the desired fumigant composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of the hexadiyne compound. The petroleum distillates to be employed in such embodiment are carefully cut portions boiling almost entirely under 400° F. at atmospheric pressure, having a flash point above about 80° F., and leaving very small residues on evaporation. These fumigant compositions are characterized by having excellent penetrating properties and by being of low fire hazard to the shipper and user.

In the preparation of dust compositions, the hexadiyne compound is dispersed in and on a finely divided material such as chalk, talc, gypsum and the like. In such operations, the finely divided carrier is mechanically ground with the carriers or is mixed or wet with the compound of a volatile organic solvent solution thereof. Similarly, dust compositions containing the compound may be prepared from various of the solid surface active dispersing agents such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such dust compositions may be dispersed in water to form aqueous soil treating compositions. If desired, such dispersion may be carried out with the aid of a surface active dispersing agent.

In another preferred embodiment, the toxicant is dispersed on and in an exploded mica to produce compositions adapted particularly to be employed in operations where a gradual and prolonged release of the toxicant is desired. In preparing such compositions, a coarsely subdivided mica carrier is mixed or wet with the compound and the resulting product thereafter packaged in air-tight containers to prevent loss of toxicant by volatilization prior to use. In compositions employed to supply the desired dosage, suitable proportions of toxicant are from about 1 to 4 times the weight of the mica carrier.

In a further embodiment, the toxicant compound or solution thereof is encapsulated in small gelatine capsules in known procedures such as salt-coacervation. Such encapsulated product is adapted to be distributed in soil to provide effective concentrations of the toxicant therein.

When operating in accordance with the present invention, the soil may be impregnated with the hexadiyne compound or a composition containing the toxicant, in any convenient fashion, e.g. by simple mixing with the soil, by employing a liquid carrier to accomplish the penetration and impregnation, or by injection or drilling techniques whereby the toxicant is deposited beneath the surface of the soil. Where injection or drilling techniques are concerned, the soil may be blanketed to suppress the volatilization of fumigant therefrom. In general, it is desirable that the distribution be carried out at a soil temperature of 45° F. or higher since the effectiveness of the compound may be somewhat reduced at lower temperatures.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant. Following the distribution of the compound, it is desirable that any planting operation not be carried out for a period of at least several days, the exact period depending upon the concentration of the compound employed and the resistance of the species concerned to the hexadiyne compound. Where minimum dosages are employed, as for example in side-dressing operations, existing mature vegetation of species resistant to the compound are not unfavorably affected by the concentrations of the treating composition temporarily present in the soil.

*Example 1*

An acetone solution containing 50 grams of 1,6-dichloro-2,4-hexadiyne per liter was employed for the treatment of sandy loam soil heavily infested with root knot nematodes. In the treating operations, the soil was placed in sealable containers and injected with the composition in an amount sufficient to supply 50 pounds of 1,6-dichloro-2,4-hexadiyne per acre foot of soil. This corresponds to a concentration of 12.5 parts by weight of the toxicant compound per million parts by weight of soil. Following the treatment, the containers were sealed and thereafter set aside at an average temperature of about 22° C. In a check operation, sealed containers containing the same infested but untreated soil were exposed to identical conditions as the treated soil.

After two weeks, the containers were opened and aerated for one week and portions of the treated and untreated soil thereafter planted with cucumber seeds. During the subsequent growing period, there was observed no adverse effects upon germination and growth of the seeds and emerging seedlings attributable to the treating compound. Three weeks after seeding, the plants were lifted from the soil, their roots washed and the latter examined for gall formation attributable to nematode attack. The examination indicates that a 100 percent control of nematodes had been obtained in the treated soil. At the time of the observations, the plants from the untreated check soil were found to have their roots covered with galls attributable to nematode attack.

*Example 2*

95 parts by weight of 1,6-dichloro-2,4-hexadiyne and 10 parts by weight of a sorbitan monolaurate polyoxyethylene derivative (Tween 20) are mechanically mixed together to prepare a concentrate composition in the form of a dispersable liquid.

Also, 45 parts by weight of 1,6-dichloro-2,4-hexadiyne, 50 parts by weight of xylene and 5 parts by weight of a dimeric alkylated aryl polyether alcohol (Triton X–155) are mixed together to produce an emulsifiable concentrate composition.

These compositions are adapted to be dispersed in water to produce aqueous compositions having very desirable wetting and penetrating properties. The latter compositions are adapted to be employed to treat soil and distribute the 1,6-dichloro-2,4-hexadiyne compound therein in effective concentrations.

*Example 3*

1,6-dichloro-2,4-hexadiyne was dissolved in acetone to prepare compositions containing 10, 5 and 1 grams of the 1,6-dichloro-2,4-hexadiyne compound per liter. These compositions were employed in the manner as described in Example 1 for the treatment of soil heavily infested with root knot nematodes. In the treating operations, the soil was placed in sealable containers and injected with the compositions at dosages of 10, 5 and 2 pounds, respectively, per acre foot of soil. These dosages correspond to concentrations of 2.5, 1.2 and 0.25 parts by weight, respectively, per million parts by weight of soil. Following the treatment, the containers were sealed and set aside at the temperature of 22° C. In a check operation, sealed containers containing the same infested but untreated soil were exposed to identical conditions as the treated soil.

The management of the containers and planting of the treated soil were all as previously described with no adverse effect attributable to the treating compound being observed upon the germination of the seeds and emerging seedlings. About 3 weeks after planting, the cucumber plants were lifted from the soil, their roots washed and the latter examined for galls attributable to nematode attack. The examination showed that a complete kill of nematodes had been obtained in the treated soil at all treatment dosages. At the time of the examination, the plants from the untreated check soil were found to be stunted and their roots covered with galls due to the attack of root knot nematodes.

*Example 4*

An acetone solution containing 0.5 gram of 1,6-dichloro 2,4-hexadiyne in 5 milliliters of acetone was dispersed in water to prepare aqueous compositions containing 80, 40, 20 and 5 parts by weight of toxicant per million parts by weight of ultimate mixture. These compositions were employed for the treatment of plots of sandy loam soil of good nutrient content heavily infested with root knot nematodes. In the treating operations, the compositions were applied to the soil as a drench and in an amount sufficient to supply 32, 16, 8 and 2 parts, respectively, by weight of 1,6-dichloro-2,4-hexadiyne per million parts by weight of soil. Seven days after treatment, the treated areas are planted with cucumber seeds. In a check operation, similarly infested but untreated soil was also planted with cucumber seeds.

About 5 weeks after seeding, the plants were lifted from the soil, their roots washed and the latter examined for galls attributable to root knot nematode disease. The examination showed that a complete kill of nematodes had been obtained in the soil treated with 1,6-dichloro-2,4-hexadiyne at all treatment dosages. At the time of the observations, the plants from the untreated check soil were found to have their roots covered with galls attributable to the attack of root knot nematodes.

*Example 5*

An acetone solution containing 5 grams of 1,6-dichloro-2,4-hexadiyne per liter was employed for the treatment of a sandy loam soil heavily infested with the organisms *Fusarium solani*, *Pythium* spp. and *Rhizoctonia solani*. In the treating operations, the soil was placed in sealable containers and injected with the acetone composition in an amount sufficient to supply 10 parts by weight of 1,6-dichloro-2,4-hexadiyne per million parts by weight of soil. Following the treatment, the containers were sealed and the soil therein mechanically mixed to insure uniform distribution of the composition. After mixing, the containers of treated soil were incubated at an average temperature of about 25° C. In a check operation, sealed containers containing the same infested but untreated soil were exposed to identical conditions as the treated soil.

After three days, the containers were opened and portions of the treated and untreated soil cultured by the dilution plate method as described by J. P. Martin in "Soil science," 69, No. 3, pp. 215–32 (March 1950) to determine the percent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 gram of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for three days at 25° C. After incubation, the plates were examined and counts of fungal colonies made in order to determine the percent control of the complex of damping-off and vascular wilt organisms. The examination showed that an 83 percent kill of the fungal organisms had been obtained in the treated soil.

*Example 6*

An acetone solution containing 10 grams of 1,6-dichloro-2,4-hexadiyne per liter was employed for the treatment of sandy loam soil of good nutrient content and observations made of the control of the growth of the seeds and emerging seedlings of rape, crab grass, and oats. In such determinations, the composition was employed for the treatment of soil which had been planted with the seeds of the named plant species. In the treating operations, the soil was injected with the composition in an amount sufficient to supply 60 pounds of 1,6-dichloro-2,4-hexadiyne per acre foot of soil. This corresponds to a concentration of about 15 parts by weight of 1,6-dichloro-2,4-hexadiyne per million parts by weight of soil. In a check operation, other areas of similarly planted soil were left untreated.

About 3 weeks after treatment, observations were carried out to determine what control of the growth of seeds and emerging seedlings had been obtained. The observations showed a complete kill of the seeds and emerging seedlings of rape, crab grass and oats in the treated soil. At the time of the observations, the untreated checks were found to support luxuriant and vigorously growing stands of rape, crab grass and oats.

I claim:

1. A method useful for the purpose of inhibiting the growth of seeds and seedlings and destroying soil inhabiting invertebrate organisms which comprises applying to and mixing with soil 1,6-dichloro-2,4-hexadiyne as an active agent in the amount of at least 0.1 part by weight per million parts by weight of the soil.

2. A method useful for the purpose of improving the plant growing properties of soil and destroying soil inhabiting invertebrate organisms which comprises impregnating soil with 1,6-dichloro-2,4-hexadiyne in the amount of at least 0.1 part by weight per million parts by weight of soil.

3. In the practice of agricultural economy, a method useful for the purpose of inhibiting the growth of seeds and seedlings and destroying soil inhabiting invertebrate organisms which comprises impregnating field soil with 1,6-dichloro-2,4-hexadiyne at a substantially uniform dosage of at least one pound per acre, the impregnation being carried out through such a cross-section of the soil as to provide for the presence therein of at least 0.1 part by weight of the 1,6-dichloro-2,4-hexadiyne compound per million parts by weight of soil.

4. A composition which comprises as an active ingredient 1,6-dichloro-2,4-hexadiyne in admixture with a surface active dispersing agent, the active ingredient being present in the amount of from 5 to 98 percent by weight.

5. A composition which comprises an aqueous dispersion of the composition claimed in claim 4, the active ingredient in such composition being present in the amount of at least 0.0001 percent by weight.

6. A composition which comprises as an active ingredient 1,6-dichloro-2,4-hexadiyne in admixture with a finely divided inert solid, the active ingredient being present in the amount of from 5 to 98 percent by weight.

7. A composition comprising a petroleum distillate solution of 1,6-dichloro-2,4-hexadiyne, the 1,6-dichloro-2,4-hexadiyne compound being present in the composition in the amount of at least 0.001 percent by weight and the petroleum distillate being a fraction boiling almost entirely under 400° F. at atmospheric pressure and having a flash point above 80° F.

References Cited in the file of this patent

UNITED STATES PATENTS

| | | |
|---|---|---|
| 2,415,251 | Leavitt | Feb. 4, 1947 |
| 2,801,160 | Iserson | July 30, 1957 |
| 2,849,364 | Youngson | Aug. 26, 1958 |

OTHER REFERENCES

Bohlmann et al. in "Chemical Abstracts," vol. 49, 1955, col. 10, 200f.